United States Patent
Amlekar et al.

(10) Patent No.: US 7,685,255 B2
(45) Date of Patent: Mar. 23, 2010

(54) SYSTEM AND METHOD FOR PREFETCHING UNCACHEABLE EMBEDDED OBJECTS

(75) Inventors: Shekhar Amlekar, Bangalore (IN); Niall Doherty, Sunnyvale, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 696 days.

(21) Appl. No.: 11/500,054

(22) Filed: Aug. 7, 2006

(65) Prior Publication Data
US 2007/0250601 A1    Oct. 25, 2007

(30) Foreign Application Priority Data
Apr. 24, 2006   (IN)   ................. 1035/DEL/2006

(51) Int. Cl.
*G06F 15/16*   (2006.01)
(52) U.S. Cl. ................. 709/217; 709/206; 709/226; 709/236; 709/203; 711/137
(58) Field of Classification Search ................. 709/217, 709/203, 206, 226, 236; 711/137
See application file for complete search history.

(56) References Cited

U.S. PATENT DOCUMENTS

| | | | |
|---|---|---|---|
| 6,954,797 B1* | 10/2005 | Takeda et al. ............... | 709/236 |
| 6,957,306 B2* | 10/2005 | So et al. .................... | 711/137 |
| 7,197,602 B2* | 3/2007 | Malcolm .................... | 711/138 |
| 2003/0191800 A1* | 10/2003 | Challenger et al. .......... | 709/203 |

* cited by examiner

*Primary Examiner*—Wing F Chan
*Assistant Examiner*—Ruolei Zong
(74) *Attorney, Agent, or Firm*—Sonnenschein Nath & Rosenthal LLP

(57) ABSTRACT

A system and method for prefetching one or more embedded objects marked uncacheable using a buffer on a prefetch cache to temporarily store the uncacheable object. The buffer is allocated to a socket that is established between the prefetch cache and a server subsequent to the establishment of an initial connection. A prefetch caching process retrieves one or more embedded objects from the server using the socket based on the preconfigured set of rules. The prefetch caching process determines whether the embedded object is uncacheable, and if so loads the object into the buffer. The prefetch caching process waits a predetermined time period for client request for the object. If the request is received prior to expiration of the time period, the prefetch caching process sends the object to the client. Otherwise, the process "flushes" the buffer, thereby discarding the object, and then closes the socket.

17 Claims, 7 Drawing Sheets

SYSTEM AND METHOD FOR PREFETCHING UNCACHEABLE EMBEDDED OBJECTS

FIELD OF THE INVENTION

The present invention relates to prefetching in a computer network and, more particularly, to a technique for prefetching uncacheable embedded objects in a computer network.

BACKGROUND OF THE INVENTION

In general, a server may be configured to provide information to one or more clients according to a client/server model of information delivery. According to this model, the server may comprise a storage system that typically contains one or more mass storage devices, such as magnetic hard disks, in which information may be stored and retrieved as desired. The server is usually deployed over a computer network comprising a geographically distributed collection of interconnected communication links, such as Ethernet, optical or wireless links, that allow the clients to remotely access the server's stored information. The clients may include network devices or computers that are directly or indirectly attached to the server via, e.g., point-to-point links, shared local area networks (LAN), wide area networks (WAN) or virtual private networks (VPN) implemented over a public network such as the Internet. Other clients may include software applications executing on computers configured to communicate with the server.

In some client/server arrangements, the server may be configured with a prefetch cache that stores previously-accessed or frequently-accessed client information. As such, the prefetch cache reduces the load on one or more servers ("origin servers") by performing a prefetch operation to anticipate and retrieve data objects from the origin server before client requests are received based on a preconfigured set of rules or polices, e.g., selected by a system administrator. That is, the prefetch cache performs the prefetch operation to obviate the need for the origin server to process future requests to retrieve these same data objects. Processing of such requests consumes resources of the server and increases the latency associated with servicing the requests, particularly if the data objects must be retrieved from disks of the server. As used herein, a "data object" is broadly defined as any collection of data that is identifiable by a common name, such as a uniform resource locator (URL), and therefore may include conventional files, HyperText Markup Language (HTML) files ("webpages"), streaming media, software applications, JAVA™ applets, etc. Furthermore, a collection of data objects is a "data set", e.g., a webpage of a website, wherein the term "website" includes both the origin server and the prefetch cache. However, one skilled in the art could contemplate a website including only the origin server with the prefetch cache residing at a different location in the network. Additionally, an "embedded object" is any data object except html, which is stored within a data set or, more precisely, an html file.

Clients typically communicate with the prefetch cache by exchanging discrete packets of data formatted according to predefined file-access protocols, such as the HyperText Transfer Protocol (HTTP), Network File System (NFS) protocol, Common Internet File System (CIFS) protocol, File Transfer Protocol (FTP), etc. A client may issue a file-access request that specifies, among other things, a specific file to access and a particular file operation to perform. The prefetch cache receives the client request, processes the request and, when appropriate, returns a response. For example, the client may issue a file "read" request to the cache and, in response, the cache may return a file-access response containing the client's requested file.

In practice, the prefetch cache can be configured to operate as a "reverse proxy" or "forward proxy" cache. A reverse-proxy cache is a server that stores a selected set of information from one or more origin servers. For example, a multimedia company may copy selected streaming audio or video content from its origin servers to a reverse-proxy cache, which is then used as an "accelerator" for providing access to the selected content. In contrast, a forward-proxy cache is a server that stores network data for a particular set of clients. Accordingly, unlike the reverse-proxy cache, the forward-proxy cache does not necessarily store selected data from specific origin servers and instead may store data from a variety of different origin servers, i.e., based on the network traffic patterns of the cache's associated set of clients.

Communication between the origin server and the prefetch cache involves the exchange of information using communication resources of the server and cache. The communication resources include the allocation of memory or "buffers" and network protocol stacks. A network protocol stack typically comprises layers of software, such as a transport layer, an internetwork layer and a media (driver) layer. The Internet protocol (IP) is an internetwork layer protocol that provides network addressing between the prefetch cache and the origin server, whereas the transport layer provides a port service that identifies each process executing on the cache and server, and creates a connection between those processes that indicate a willingness to communicate.

As used herein, a process is a software program that is defined by a memory address space. An application programming interface (API) is a set of software calls and routines that are made available (exported) by a process and that can be referenced by other processes. Services provided by the process are typically embodied as APIs. For example, services of a database process, such as lookup operations, queries and insertions, are provided via APIs that enable other processes to perform those operations.

Transport layer services may be further embodied as a socket interface comprising a client socket library (contained within each process) and a socket server of the network protocol stack. A process accesses the network protocol stack via the socket interface by creating a process message data structure that is passed to the socket server. The process message is typically embodied as information (data) "payload" appended to a transport header, the type of which depends on the transport layer protocol used by the process. Examples of conventional transport layer protocols include the Transmission Control Protocol (TCP), User Datagram Protocol (UDP) and Raw IP. The TCP transport service provides reliable delivery of the message or packet using a TCP transport header prepended to the packet, while the UDP service provides best efforts delivery using a UDP header. Raw IP denotes a process that does not use the transport provided by the socket interface, but directly interfaces to the IP layer of the network protocol stack.

The prefetch cache and origin server generally utilize their communication resources, such as buffers and network protocol stacks, to enable communication among their processes over the network. For example to establish communication with a receiving process on the destination prefetch cache, a sending process executing on the source origin server constructs a process message using its socket library and passes it to the socket server (or transport layer) of the network protocol stack. The process message includes, inter alia, a destination network address of the prefetch cache, a destination port number of the receiving process and, if appropriate, payload (data). The sending process passes that information as a connection request to its socket library to initialize a socket (i.e., open a virtual connection). The communication resources of the origin server and prefetch cache then establish communication between the processes.

To that end, the socket server also includes a library that is used to create a network layer (e.g., IP) header having, inter alia, source and destination network (IP) addresses. The socket server prepends the IP header to the transport header and passes that "packet" structure to the IP layer, which constructs a media access (MAC) header. The information contained within the packet structure, including any data, is stored in a buffer allocated to the socket. The IP layer performs a lookup operation into a forwarding information base (FIB) to determine an outgoing physical interface for the connection. The FIB includes a forwarding table that contains forwarding information, such as mappings of layer 3 (L3) network addresses to layer 2 (L2) MAC addresses and outgoing interfaces. Upon obtaining the proper outgoing interface, the IP layer prepends the MAC header to the packet structure and passes it to the media layer, which sends the resulting information in the buffer as a packet over the network to the prefetch cache.

As noted, the prefetch cache operating in either reverse-proxy or forward-proxy mode may be used to anticipate client requests using, e.g., a conventional method of object prefetching over a virtual connection or socket between the cache and origin server. In response to a client sending a request to access a data set, e.g., a webpage, the prefetch cache determines whether the data is stored locally on its disks and, if so, sends the data set to the client. Otherwise, the prefetch cache retrieves the data from the origin server over the socket. When retrieving the data, the prefetch cache anticipates future client requests for data objects based on the preconfigured set of rules and, to that end, attempts to retrieve ("cache") the objects from the server for storage on its disks. In the case of the webpage, the prefetch cache retrieves an html file from the server and examines headers of data objects embedded in the file (embedded objects) to determine whether the objects are cacheable. If so, the prefetch cache instructs the server to send the objects over the socket to the cache. If the embedded objects are uncacheable, the prefetch cache and origin server cooperate to close the socket, and the objects are not retrieved.

Certain data objects may be rendered uncacheable for a variety of reasons. For example, a website administrator may render (i.e., mark) an object as uncacheable in order to obtain an accurate count of the number of times the website is accessed, i.e., the number of "hits on the website." Here, a count can be taken from the number of times the object is downloaded to a user. Another reason that an administrator may want to mark an object as uncacheable is the object frequently changes, such as in the example of an image file of a local radar display. Note that in both cases, the object may be an embedded object (e.g., an applet) within a file (e.g., an html file). By marking the object as uncacheable, the administrator ensures the user accesses the most up-to-date version of the object.

Website administrators commonly mark embedded objects on a website uncacheable by, for example, setting a cache-control response header of the object to values of no-cache, private, or max-age=0. Uncacheable or no-cache denotes that the object is marked to prevent caching by forcing a request to an origin server before releasing the object each time that the object is requested. Private denotes the object is marked to limit access only to a certain predetermined (end) user or group of end users. For example, after a login page, all the objects on an html mail site may be marked private. Max-age=0 does not automatically render the object uncacheable, but results in the object being uncacheable because the object needs to be revalidated upon every request. The header alerts the cache to only retain the object for 0 seconds and revalidate after the expiration of that time period.

As noted, when an embedded object is uncacheable, the conventional method of object prefetching abandons any prefetch operation and closes the socket between the prefetch cache and origin server. Thus, the conventional method cannot prefetch the embedded object, i.e., the object cannot be retrieved from the origin server and stored on the prefetch cache to obviate future retrieval requests for the object to the server. The present invention is directed to reduce the response time to the client when the embedded objects are uncacheable.

SUMMARY OF THE INVENTION

The present invention overcomes the disadvantages of the prior art by providing a system and method for prefetching one or more embedded objects marked uncacheable using a staging area on a prefetch cache to temporarily store (load) the uncacheable object. According to the invention, the staging area is a buffer allocated to a socket that is established between a prefetch cache and the server subsequent to the establishment of an initial connection. A prefetch caching process of the prefetch cache opens the socket and retrieves the embedded object. The prefetch caching process then determines whether the embedded object is uncacheable. If the embedded object is uncacheable, then the embedded object is stored in the buffer on the prefetch cache. Notably, however, the prefetch caching process does not automatically send the object to the client. Instead, the prefetch caching process waits a predetermined time period for the cache to receive a client request for the object. If the request is received prior to expiration of the time period, the prefetch caching process sends the object over the socket to the client. Otherwise, the process "flushes" the buffer, thereby discarding the object, and then closes the socket.

In the illustrative embodiment, a client issues a request to a website to access a data set, e.g., a webpage. The prefetch cache intercepts the request and determines whether the requested webpage is stored locally on the cache or remotely on an origin server of the website. If the webpage is locally stored, then the cache sends the data set directly to the client. If the webpage is not locally stored or is only partially locally stored, then the prefetch cache connects to the origin server. The prefetch cache then issues a request to retrieve the webpage and all data objects necessary to service the request and the server responds by sending the information to the prefetch cache.

Furthermore, the prefetch cache applies a preconfigured set of rules to anticipate possible future requests for one or more additional data objects that might be issued by the client. The prefetch caching process then opens one or more connections to retrieve the one or more additional objects. If the additional data object (e.g., an embedded object) is cacheable, the prefetch cache sends the data object for local storage on one or more disks of the cache. If the object is marked uncacheable, then the prefetch cache loads the uncacheable embedded object into the buffer allocated to the socket.

In response to the determination that the embedded object is uncacheable, the prefetch caching process on the prefetch cache creates an entry for the uncacheable embedded object in a cache table. The cache table entry illustratively includes a timestamp field containing a timestamp representing the time at which the object was loaded into the buffer of the socket. The prefetch caching process uses the timestamp associated with the embedded object to determine whether a threshold time limit (e.g., 5 seconds) is exceeded before a client request directed to the object is received at the prefetch cache. If the threshold time limit is not exceeded, the prefetch caching process sends the object from the buffer over the socket. Otherwise, the prefetch caching process flushes the buffer and closes the socket.

The cache table entry also includes a network address field containing a network address of the requesting client (i.e., a requesting network address). If the uncacheable embedded object is also marked private, the requesting network address, e.g., an IP address, is stored in the network address field. When the client request directed to the object is received, the prefetch caching process determines whether the requesting network address matches a predefined network address that is allowed to access the embedded object. If the addresses match, then the prefetch caching process transmits the embedded object over the socket to the client socket. If the network addresses do not match, then the object is not accessible to the client and the prefetch caching process flushes the buffer and closes the socket.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
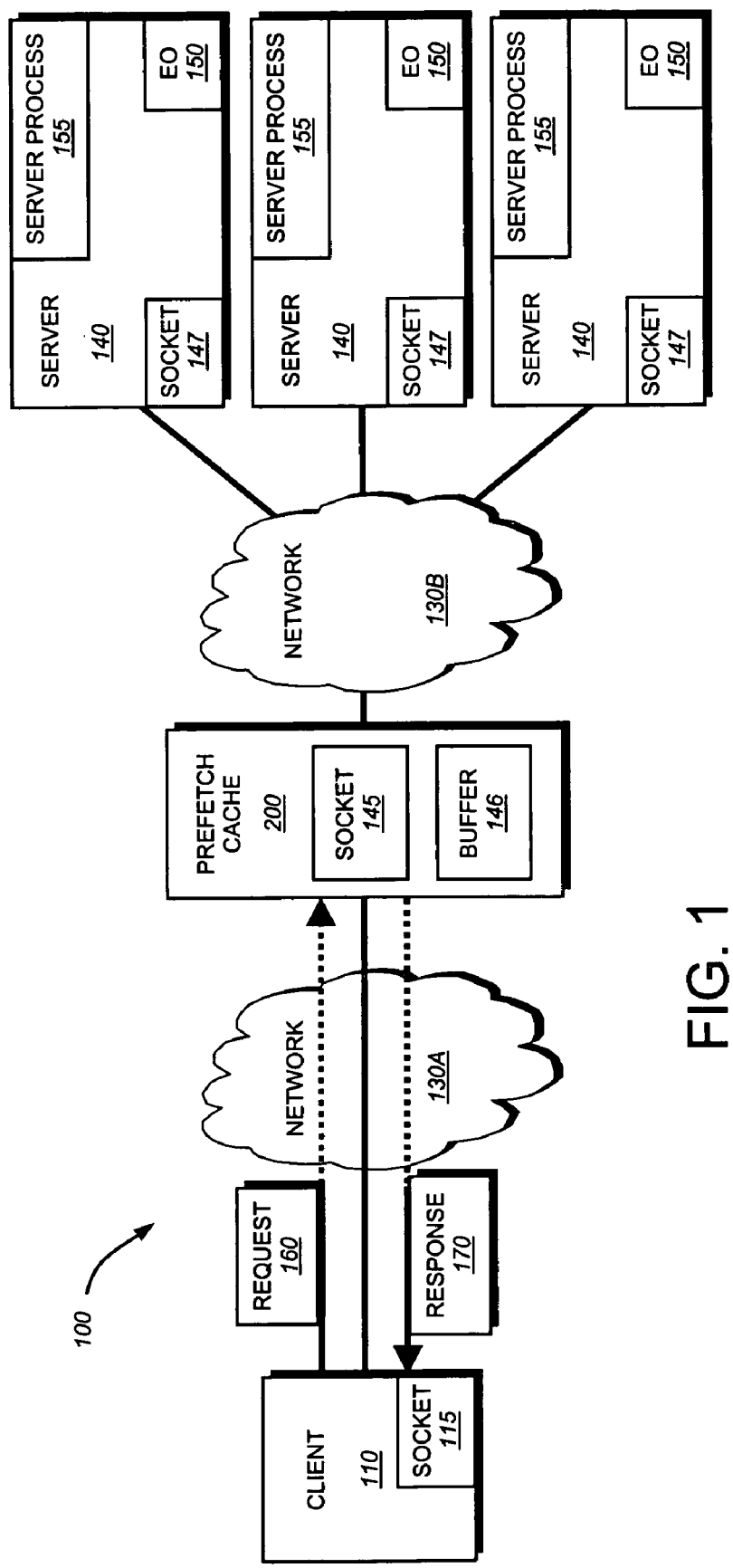
FIG. 1 is a schematic block diagram illustrating an exemplary computer network in accordance with an illustrative embodiment of the present invention.

FIG. 1 is a schematic block diagram of an exemplary computer environment 100 in which an illustrative embodiment of the invention may be deployed. The environment 100 includes one or more clients 110 configured to request data objects or, more precisely, embedded objects (EO) 150 stored on a set of origin servers 140. In practice, the servers 140 may be conventional HTTP, WAFS (wide area file systems) or FTP servers that provide access to various types of media content or embedded objects 150, such as webpages, streaming audio or video files, image files, etc. As shown, the clients 110 do not directly communicate with the servers 140, but instead communicate with an intermediate prefetch cache 200 that is coupled to the servers 140, e.g., through a network 130A, B. Alternatively, at least some of the servers 140 may be directly connected to the prefetch cache 200. Likewise, the client 110 may be directly attached to the prefetch cache 200 or coupled to the prefetch cache, e.g., through the network 130A, B. Additionally, the client 110 can be connected through the network 130A, B to the origin servers 140 with the prefetch cache 200 located within the network 130A, B. It should be noted that while network 130A is shown separate from network 130B, this depiction is for illustrative purposes only. Network 130A may be the same network as network 130B or may comprise separate networks. As such, the depiction of networks 130A, B being separate should be taken as illustrative only.

The prefetch cache 200 may be configured to operate in a forward or reverse proxy mode. That is, the prefetch cache 200 may be used to accelerate access to a selected subset of files stored in the origin servers 140 (reverse proxy mode) or may be configured to store copies of those files that were recently accessed from the origin servers by a selected set of clients (forward proxy mode). In either mode of operation, the prefetch cache 200 may intercept an object-access request 160 issued by a client 110 and directed to an appropriate origin server 140. The client's request typically identifies a particular file, a data set, or a webpage that the client desires to access. The prefetch cache 200 analyzes the received request to determine whether it contains a local copy of the client-requested object. If so, the prefetch cache 200 returns its local copy of the requested object to the client in an object-access response 170. However, if the client-requested object is not already resident in the prefetch cache 200, the prefetch cache 200 may be configured to retrieve the requested object from the appropriate origin server 140.

Although the object-access request 160 and response 170 are depicted as individual data packets exchanged between the client 110 and the prefetch cache 200, those skilled in the art will appreciate that the request and response may be transmitted as a plurality of data packets. Typically, the request and response are formatted according to a predetermined object-access protocol, such as HTTP, and are transported using a reliable transport protocol, such as the conventional Transmission Control Protocol (TCP). More generally, the client/server communications may be implemented using any acceptable network protocol(s) and/or physical media.

In the illustrative embodiment, the prefetch cache 200 and one or more servers 140 are operated as a website configured to store one or more embedded objects (EO) 150 comprising streaming audio or video files, image files, etc in the form of, e.g., a webpage. The prefetch cache 200 is further configured to prefetch the embedded objects 150 based on a preconfigured set of rules. To that end, the prefetch cache 200 retrieves the embedded objects 150 from the server 140 using one or more connections (e.g., a socket connection). The prefetching caching process 250 opens a socket 145 to retrieve one or more embedded objects 150 using, e.g., an Open command. The Open command may be a Listen command, where the Listen command directs a connection to a socket 145 and waits for a Receive command. Another command type used to open the socket is an Accept command which accepts a connection to a foreign socket, such as a client socket 115. The Open command, Close command, Send command, and Receive command are all described in *Request for Comments (RFC) 121—Network On-line Operators*, Apr. 21, 1971, which is hereby incorporated by reference. The prefetch caching process 250 then determines whether the embedded objects 150 are cacheable or not cacheable. If cacheable, then each embedded object 150 is loaded onto the prefetch cache 200 using a conventional method of object prefetching to enable faster access to the object upon a client request. The cacheable objects are loaded and stored in disks 235 connected to the prefetch cache 200.

If the object 150 is not cacheable, then, according to the present invention, a prefetch caching process 250 uses a Load command to load the embedded object 150 into a buffer 146 allocated to the socket 145. Conventionally, the buffer 146 can store 16 KB of data, and the embedded object 150 is loaded into the buffer up to the maximum capacity of the buffer. If the object is greater than 16 KB (or the maximum capacity of the buffer), then only part of the embedded object is stored in the buffer and the remaining part may be streamed through the socket once data is read from the buffer. Though the novel system and method as described herein uses a 16 KB buffer, differing sized buffers may be used with the present invention. When a client request 160 is intercepted by the prefetch cache 200, the prefetch cache sends the embedded object 150 from the buffer of the socket 145 to a client socket 115 using Send and Receive commands, respectively.

Figure 2A:
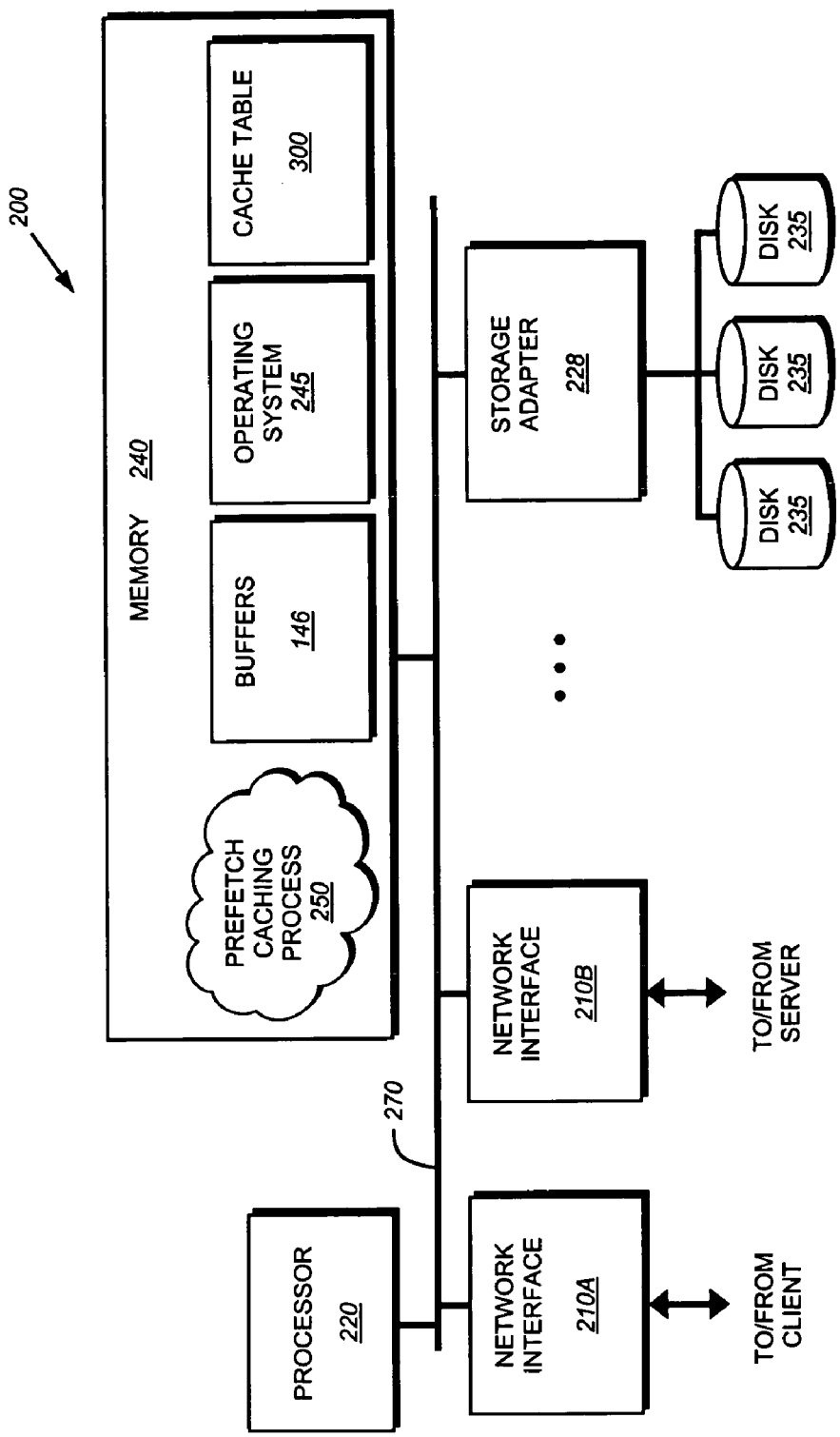
FIG. 2A is a schematic block diagram of an exemplary prefetch cache that may be used in accordance with an illustrative embodiment of the present invention.

FIG. 2A is a schematic block diagram of an exemplary prefetch cache 200 that may be advantageously used with the present invention. Although the prefetch cache is illustrated on a generic hardware platform, the prefetch cache generally may be implemented in any type of special-purpose computer (e.g., server) or general-purpose computer. The prefetch cache 200 comprises, inter alia, one or more network interfaces 210, a processor 220, a storage adapter 228 and a memory 240 interconnected by a system bus 270.

Each network interface 210 includes the mechanical, electrical and signaling circuitry for sending and receiving data packets to/from other computers connected to the cache 200, e.g., over Ethernet links, optical links, wireless links, etc. Each network interface 210A, B may contain specialized processing elements, such as logic or processors, that format incoming and outgoing data packets consistent with a predetermined network communication protocol. For example, a first network interface 210A may be configured to exchange HTTP messages with a remote client 110, e.g., coupled to the first interface over the network 130A, while a second network interface 210B may be configured to exchange FTP messages with the server 140, e.g., coupled to the second interface via the network 130B.

The storage adapter 228 interfaces with one or more storage devices to store and retrieve a set of objects that are accessible to the clients 110. The storage adapter includes input/output (I/O) interface logic and circuitry that couples to the devices over an I/O interconnect arrangement, such as a conventional Fibre-channel serial link topology. Client-requested objects may be retrieved by the storage adapter 228 and, if necessary, processed by the processor 220 (or the adapter itself) prior to being forwarded over the system bus 270 to an appropriate network adapter 210A, B. The requested object is then formatted into an object-access response 170 and returned to the requesting client 110.

Each storage device may be embodied as a type of writable storage device, such as a magnetic or optical disk drive, a non-volatile random access memory (e.g., FLASH memory), a magnetic or optical tape drive, an erasable programmable read-only memory (EPROM) or any other form of storage device. Preferably, the storage devices are embodied as disks 235, which may be arranged into one or more Redundant Array of Independent Disks (RAID) groups, wherein each RAID group includes one or more disks configured to store striped data and at least one disk configured to store parity data, e.g., in accordance with a conventional RAID-4 configuration. However, other configurations (e.g. RAID-5 having distributed parity across stripes) are also contemplated.

The memory 240 comprises storage locations that are addressable by the processor and adapters for storing software programs, i.e., specific sets of ordered operations, and data structures. Portions of these locations are arranged and organized as buffers 146 for use with a protocol stack. The memory preferably comprises a form of random access memory (RAM) that is generally cleared by a power cycle or other reboot operation (e.g., it is a "volatile" memory). The processor and adapters comprise processing elements, logic and/or circuitry configured to execute the programs and manipulate the data structures, such as cache table 300 stored in the memory 240. It will be apparent to those skilled in the art that various types of memory means, including computer-readable media and electromagnetic signals, may be used for storing and transporting program instructions pertaining to the inventive technique described herein.

An operating system 245, portions of which are typically resident in the memory 240 and executed by the processor 220, functionally organize the cache 200 by, inter alia, invoking operations in support of processes executing on the processor. As used herein, a process refers to an instance of a program being executed by, e.g., the processor and a thread is an instance of a sequence of the program's code. An example of a process is prefetch caching process 250, which is configured to store and retrieve client-requested objects from the disks 235. Illustratively, the prefetch caching process 250 includes, inter alia, a plurality of executable threads that are configured to perform the inventive technique described herein. That is, the caching process may include one or more threads for generating and/or maintaining cache table 300 and for using the table to determine whether client-requested objects are cacheable or uncacheable. The prefetch caching process 250 cooperates with the server process 155 on an origin server 140 to acquire the set of objects for storage on disks 235. The prefetch caching process 250 may be used to configure the prefetch cache 200 as either a forward or reverse proxy server. Furthermore, the prefetch caching process 250 may be embodied within a version of the NetCache software developed by Network Appliance, Inc. of Sunnyvale, Calif. or any other similar software that is used to manage proxy-caching operations. The prefetch caching process 250 includes instructions for performing a novel prefetch operation by retrieving an embedded object 150 from the server 140 through, e.g., a socket 145 to acquire an uncacheable embedded object 150.

In operation, a client may send an object-access request 160 to an origin server 140, which request is intercepted by a network interface 210 of the prefetch cache 200. The network interface 210 cooperates with the prefetch caching process 250 to process the request and generate an appropriate object-access response 170. If client-requested object is stored locally, e.g., on disks 235, of the cache, the prefetch caching process instructs the storage adapter 228 to retrieve the client-requested object from the disks 235, before formatting the retrieved object to generate the client's object-access response. However, if the object is not locally stored or is only partially stored, the caching process 250 connects to origin server 140 to retrieve the object.

In prior art implementations, a prefetch cache 200 would automatically discard an embedded object 150 when it is marked uncacheable. In accordance with the illustrative embodiment, the prefetch caching process 250 loads the embedded object in a buffer 146 associated with socket 145 on the prefetch cache 200.

Figure 2B:
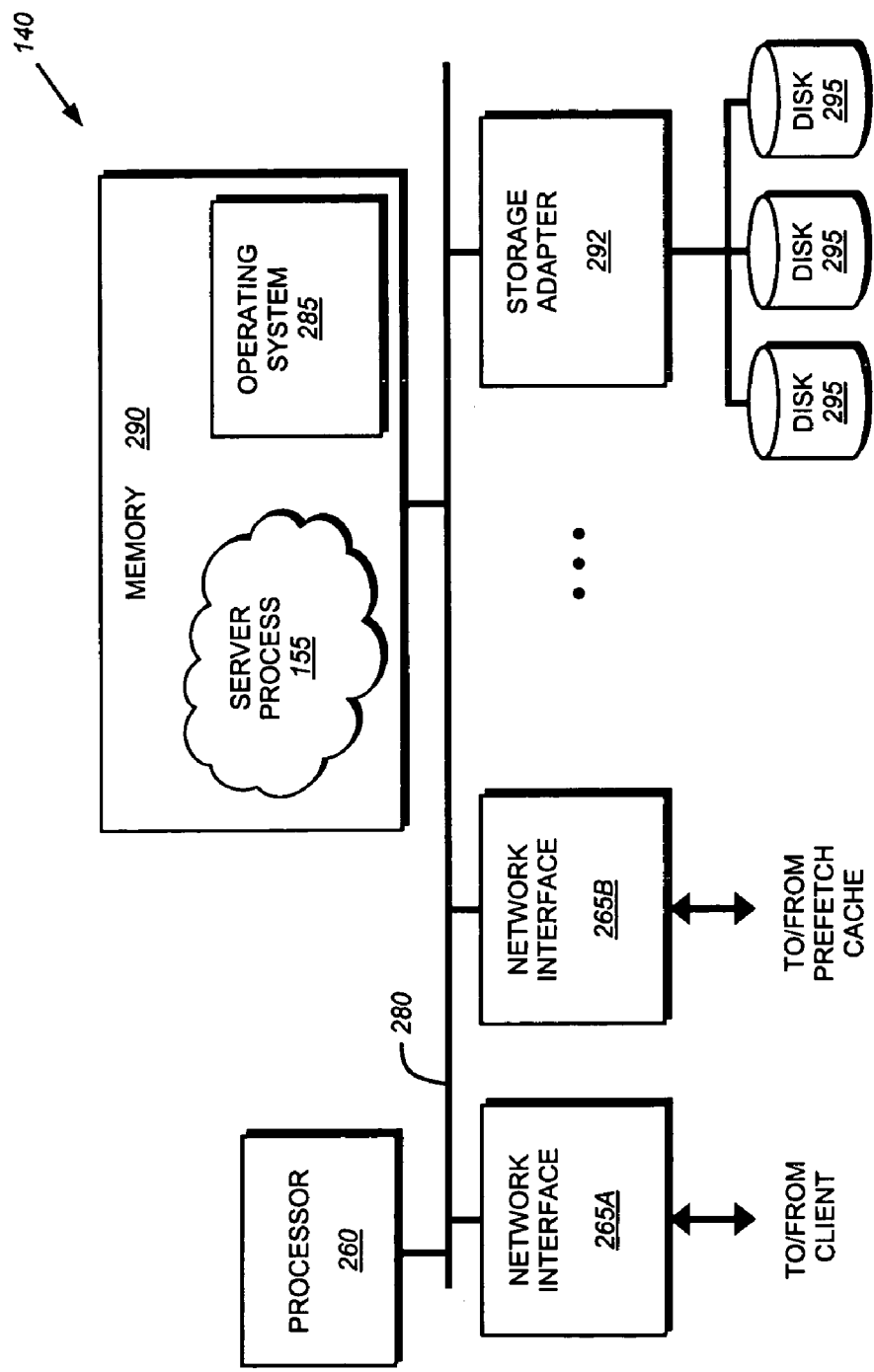
FIG. 2B is a schematic block diagram of an exemplary origin server that may be used in accordance with an illustrative embodiment of the present invention.

FIG. 2B is a schematic block diagram of an exemplary origin server 140 that may be used in accordance with an illustrative embodiment of the present invention. The server 140 comprises, inter alia, one or more network interfaces 265, a processor 260, a storage adapter 292, and a memory 290 interconnected by a system bus 280. Each network interface 265 includes the mechanical, electrical and signaling circuitry for sending and receiving data packets to/from prefetch cache 200 connected to the server 140, e.g., over Ethernet links, optical links, wireless links, etc. Each network interface 265A, B may contain specialized processing elements, such as logic or processors, that format incoming and outgoing data packets consistent with a predetermined network communication protocol. For example, a first network interface 265A may be configured to exchange HTTP messages with a remote client 110, e.g., coupled to the first interface over the network, while a second network interface 265B may be configured to exchange FTP messages with the prefetch cache 200, e.g., coupled to the second interface via the network 130B.

The storage adapter 292 interfaces with one or more storage devices to store and retrieve a set of objects that are accessible to the clients 110 and the prefetch cache 200. The storage adapter includes input/output (I/O) interface logic and circuitry that couples to the devices over an I/O interconnect arrangement, such as a conventional Fibre-channel serial link topology. Client-requested objects and prefetch cache requested objects may be retrieved by the storage adapter 292 and, if necessary, processed by the processor 260 (or the adapter itself) prior to being forwarded over the system bus 280 to an appropriate network adapter 265A, B. Each requested object is then forwarded to cache 200, where it is formatted into an object-access response 170 and returned to the requesting client 110.

Each storage device may be embodied as a type of writable storage device, such as a magnetic or optical disk drive, a non-volatile random access memory (e.g., FLASH memory), a magnetic or optical tape drive, an erasable programmable read-only memory (EPROM) or any other form of mass storage device. Preferably, the storage devices are embodied as storage disks 295, which may be arranged into one or more Redundant Array of Independent Disks (RAID) groups, wherein each RAID group includes one or more disks configured to store striped data and at least one disk configured to store parity data, e.g., in accordance with a conventional RAID-4 configuration. However, other configurations (e.g. RAID-5 having distributed parity across stripes) are also contemplated.

The memory 290 comprises storage locations that are addressable by the processor and adapters for storing software program code and data structures. The memory preferably comprises a form of random access memory (RAM) that is generally cleared by a power cycle or other reboot operation (e.g., it is a "volatile" memory). The processor 260 and adapters 292 comprise processing elements, logic and/or circuitry configured to execute the software code and manipulate the data structures stored in the memory 290. It will be apparent to those skilled in the art that various types of memory means, including computer-readable media and electromagnetic signals, may be used for storing and transporting program instructions pertaining to the inventive technique described herein.

An operating system 285, portions of which are typically resident in the memory 290 and executed by the processor 260, functionally organizing the origin server 140 by, inter alia, invoking operations in support of server process executing on the processor. An example of such a process is server process 155, which is configured to store and retrieve prefetch cache requested objects from the disks 295. Illustratively, the server process 155 includes, inter alia, a plurality of executable threads that are configured to perform the inventive technique described herein. That is, the server process 155 may include one or more threads to send an embedded object 150 to the prefetch cache 200 through the server socket 147. The server process 155 cooperates with the prefetch caching process 250, as further described herein, to receive a command calling for the server 140 to send a set of objects stored on disks 295. The server process 155 includes instructions for performing the operations of establishing a connection between the server and the prefetch cache 200, creating a server socket 147, and sending an uncacheable embedded object over the socket to the prefetch cache 200.

In operation, the prefetch cache 200 sends a prefetch cache object request to a network interface 265 of the server 140. The network interface 265 that receives the prefetch cache object request cooperates with the server process 155 to process the request and generate an appropriate response. Specifically, the server process 155 may instruct the storage adapter 292 to retrieve the prefetch cache requested object from the disks 295, before formatting the retrieved object to generate the client's object response.

In prior art implementations, a server 140 would automatically shut down a connection to a prefetch cache 200 when an embedded object 150 is uncacheable. In accordance with the illustrative embodiment, the prefetch cache 200 remains connected to the server 140 through a network protocol stack when the object 150 is uncacheable.

Figure 2C:
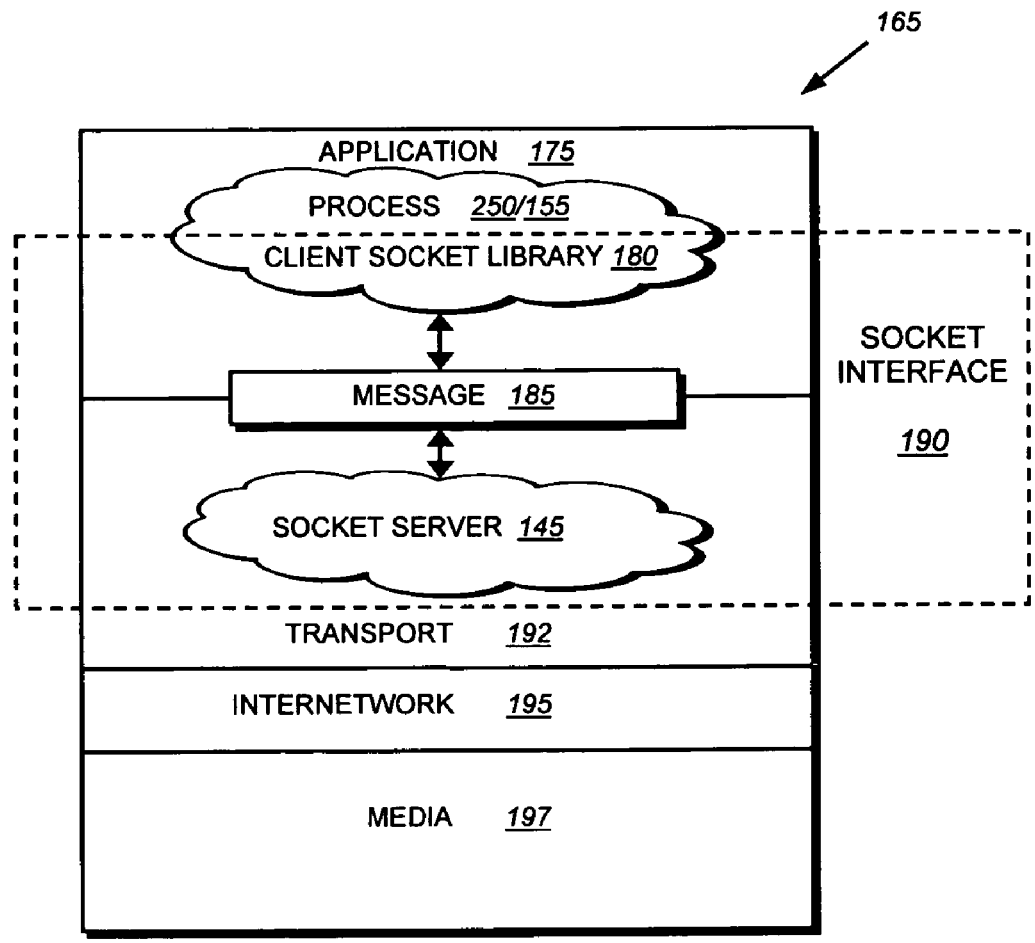
FIG. 2C is a schematic block diagram of a conventional network protocol stack that may be advantageously used with the present invention.

FIG. 2C is a schematic block diagram of a conventional network protocol stack 165, such as the Internet communications protocol stack, that may be advantageously used with the present invention. The network protocol stack is illustratively embodied within prefetch cache 200 and origin server 140, and is generally represented by four layers termed, in ascending interfacing order, the media (driver) layer 197, the internetwork layer 195, the transport layer 192 and the application layer 175. The application layer 175 includes one or more separately-scheduled processes, such as prefetch caching process 250 and server process 155.

The Internet protocol (IP) is an internetwork layer protocol that provides network addressing between the prefetch cache 200 and the origin server 140. IP is primarily a connectionless protocol that provides for internetwork routing, fragmentation and assembly of exchanged packets, and that relies on transport protocols for end-to-end reliability and other service characteristics. An example of a transport protocol is the TCP protocol, which is implemented by the transport layer 192 and provides connection-oriented, end-to-end reliability services to the upper layer protocols of the protocol stack. Examples of other transport protocols include the User Datagram Protocol (UDP), which provides best efforts delivery, and Raw IP. Raw IP denotes a process that does not use a transport, but directly interfaces to the internetwork layer 195 of the network protocol stack 165.

Broadly stated, the transport layer 192 provides a port service that identifies each process executing on the server 140 and prefetch cache 200, and creates a connection between those processes when they indicate a willingness to communicate. This transport layer service may be embodied as a socket interface 190 comprising a client socket library 180 (created within the process address space of processes 155, 250) and a socket server 145 of the network protocol stack 165. Each process 155, 250 accesses the network protocol stack 165 via the socket interface 190 by creating a process message data structure ("message") that is exchanged with the socket server 145. The message 185 is typically embodied as information (data) "payload" appended to a transport header, the type of which depends on the transport layer protocol used by the process.

The client socket library 180 thus cooperates with the socket server 145 to provide the service needed for the process 155, 250 to communicate over the network protocol stack 165. In order to use/access the service of the socket server 145, application programming interfaces (APIs) are required. That is, a process 155, 250 may access the socket server 145 via APIs complied by its client socket library 180. Examples of APIs (or function calls) include create_socket, and open_socket. The process issues these function calls to the client socket library, which implements those calls to effectuate communication.

The present invention is directed to a system and method for prefetching one or more embedded objects marked uncacheable using a staging area on a prefetch cache to temporarily store (load) the uncacheable object. According to the invention, the staging area is a buffer allocated to a socket that is established between a prefetch cache and the server subsequent to the establishment of an initial connection. A prefetch caching process of the prefetch cache opens the socket and retrieves the embedded object. The prefetch caching process then determines whether the embedded object is uncacheable. If the embedded object is uncacheable, then the embedded object is stored in the buffer on the prefetch cache. Notably, however, the prefetch caching process does not automatically send the object to the client. Instead, the prefetch caching process waits a predetermined time period for the cache to receive a client request for the object. If the request is received prior to expiration of the time period, the prefetch caching process sends the object over the socket to the client. Otherwise, the process "flushes" the buffer, thereby discarding the object, and then closes the socket.

In the illustrative embodiment, a client issues a request to a website to access a data set, e.g., a webpage. The prefetch cache intercepts the request and determines whether the requested webpage is stored locally on the cache or remotely on an origin server of the website. If the webpage is locally stored, then the cache sends the data set directly to the client. If the webpage is not locally stored or is only partially locally stored, then the prefetch cache connects to the origin server. The prefetch cache then issues a request to retrieve the webpage and all data objects necessary to service the request and the server responds by sending the information to the prefetch cache.

Furthermore, the prefetch cache applies a preconfigured set of rules to anticipate possible future requests for one or more additional data objects that might be issued by the client. The prefetch caching process then opens one or more connections to retrieve the one or more additional objects. If the additional data object (e.g., an embedded object) is cacheable, the prefetch cache sends the data object for local storage on one or more disks of the cache. If the object is marked uncacheable, then the prefetch cache loads the uncacheable embedded object into the buffer allocated to the socket.

Figure 3:
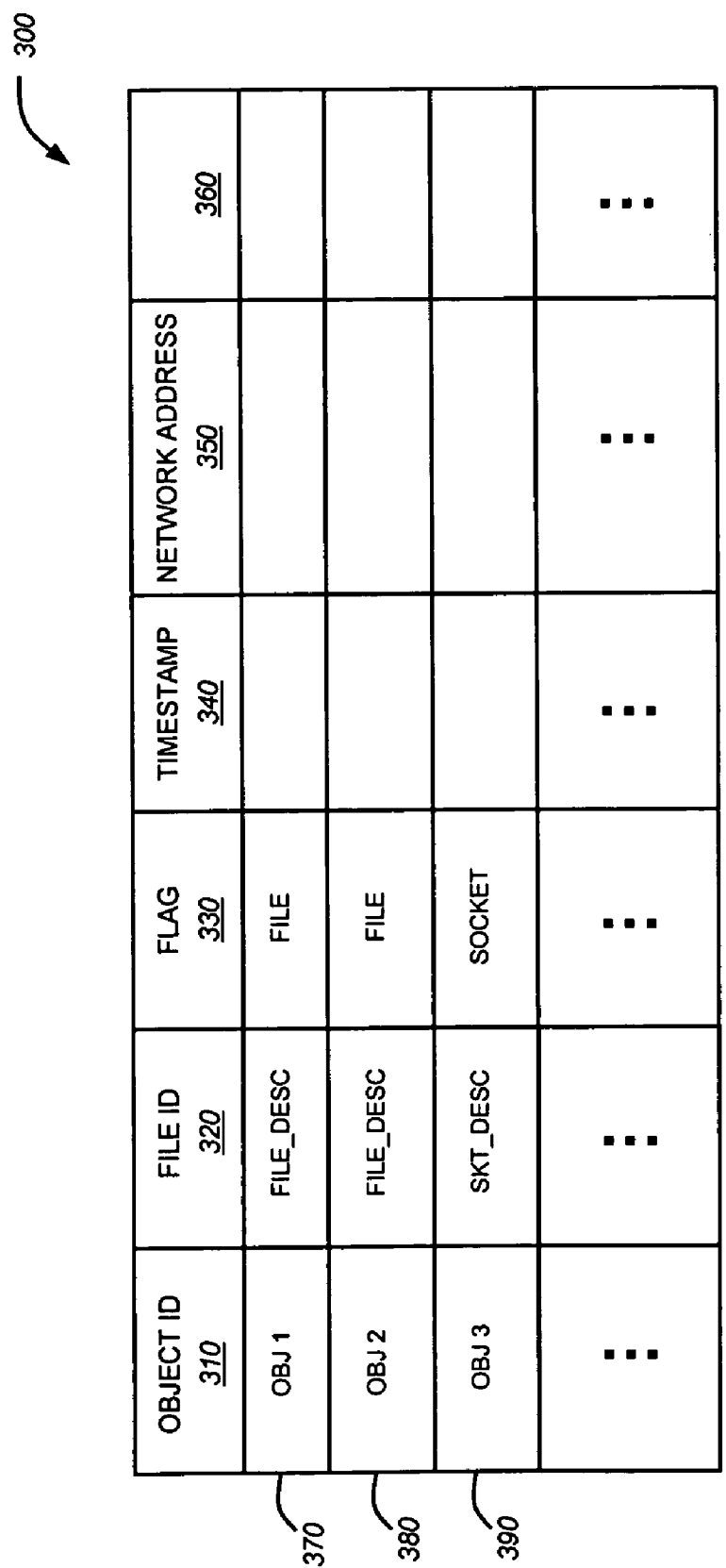
FIG. 3 is a schematic block diagram of an exemplary cache table which may be used in accordance with an illustrative embodiment of the present invention.

In response to the determination that the embedded object is uncacheable, the prefetch caching process on the prefetch cache creates an entry for the uncacheable embedded object in a cache table. FIG. 3 illustrates a cache table 300 which may be used in accordance with the illustrative embodiments of the present invention. The table 300 includes a plurality of entries 370, 380, 390, each of which comprises an Object ID field 310, a File ID field 320, a Flag field 330, a Timestamp field 340, a Network Address field 350, and, in alternate embodiments, additional fields 360. For example, Object ID field 310 contains an identification of the embedded object. The File ID field 320 contains applications of the file type. The Flag field 330 contains the file type of the embedded object. The Timestamp 340 contains the time the embedded object was loaded into the buffer 146. The Network Address field 350 contains an address to retrieve the embedded object. For example, the object identified in field 310 of entry 370 (e.g. OBJ 1) is being marked as FILE in field 330; as such the file can be sent immediately to prefetch cache 200 and locally stored on disks 235. (Note that entry 380 (e.g. OBJ 2) is similar to entry 370.) In contrast, the object identified in field 310 of entry 390 (e.g. OBJ 3) could be an image or a sound bite, as denoted by the Flag 330 being marked SOCKET. Notably marking of the object as SOCKET indicates that the object is stored in a buffer 146 associated with socket 145. The content of Network Address field 350 for entry 390 is an address (e.g. IP address) indicating the location of socket 145 on prefetch cache 200 that terminates the socket (virtual connection).

Using its object-file-matching thread, the prefetch caching process 250 compares a client-requested object with the contents of cache table 300 in order to determine whether the embedded object 150 is stored in a buffer associated with socket 145. The flag 330 in each entry 370, 380, 390 of cache table 300 indicates whether the object is a file stored in disks of the prefetch cache 200 or sent to the buffer 146 on the prefetch cache 200. Accordingly, by examining the file type stored in the cache table (as well as other information about the client-requested object), the prefetch caching process 250 can determine the location of the socket that receives the object 150 from the server 140, and then forwards the object to the client socket 115, upon a client request 160.

As noted, each cache table entry illustratively includes a timestamp field 340 containing a timestamp representing the time at which the object was loaded into the buffer of the socket. The prefetch caching process uses the timestamp associated with the embedded object to determine whether a threshold time limit (e.g., 5 seconds) is exceeded before a client request directed to the object is received at the prefetch cache. That is the timestamp is used to determine if the object has aged too long before a client request 160 is received. Periodically, the timestamp is compared with the threshold limit, and if the difference between the actual time and the timestamp is greater then the threshold, the buffer 146 is flushed of the embedded object 150. If the difference between the actual time and the timestamp is less than or equal to the threshold, the object 150 remains in buffer 146 associated with socket 145, and waits for the client request 160. An object 150 is flushed from the buffer after a threshold time is reached because of limited memory allocated for the network protocol stack 165 and for converting packets for storage.

Figure 4:
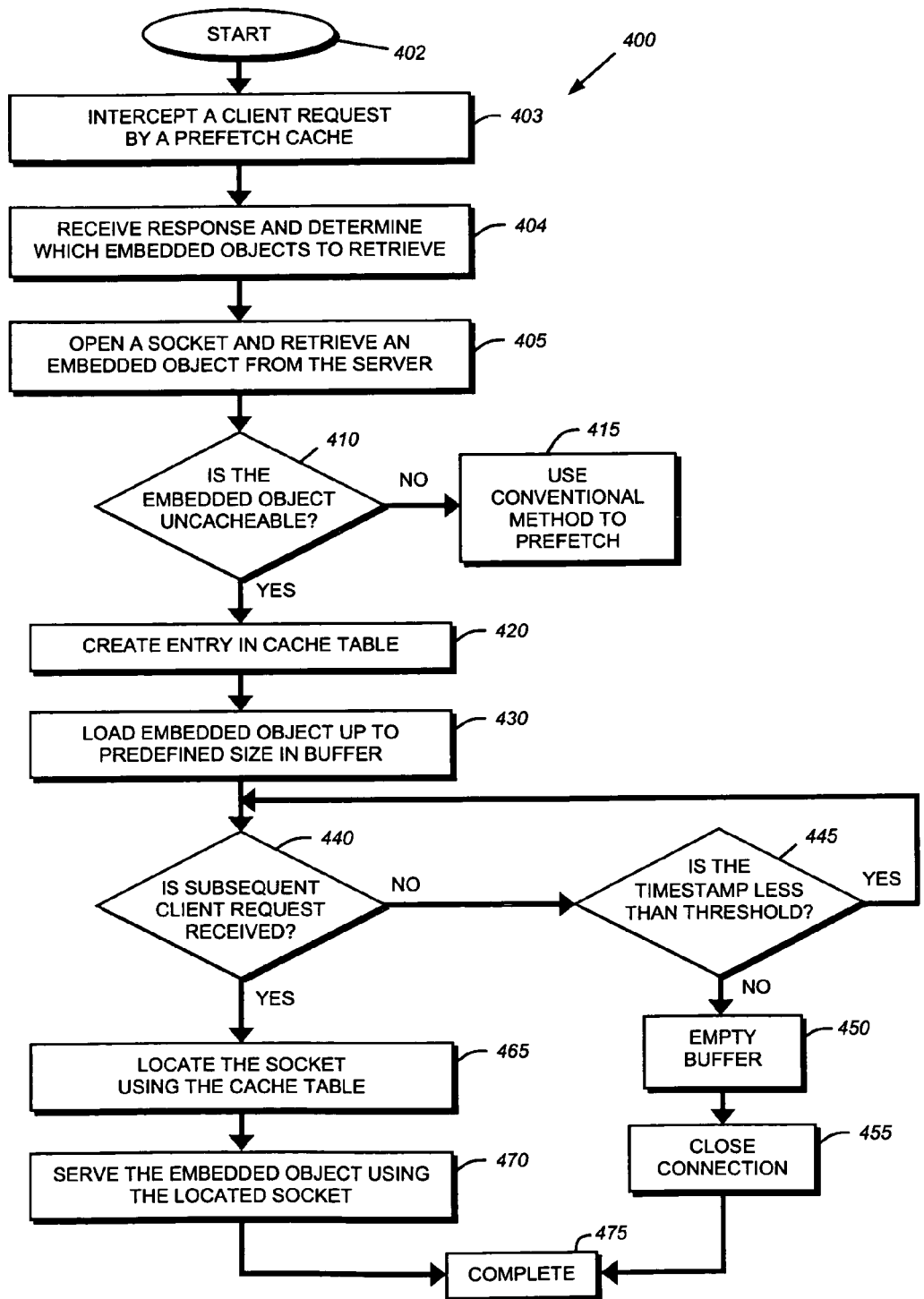
FIG. 4 is a flowchart illustrating the steps of a procedure for uncacheable object prefetch in accordance with an illustrative embodiment of the present invention.

FIG. 4 is a flowchart detailing the steps of a procedure 400 for prefetching an uncacheable embedded object in accordance with the present invention. The procedure 400 starts at step 402, and proceeds to step 403, where the prefetch cache 200 intercepts a client request directed to an origin server 140 to access a website to obtain a data set, e.g., a webpage. The prefetch cache 200 sends the webpage to the client from data stored locally on the disks 235 of the prefetch cache 200 or the prefetch cache 200 retrieves the page from the server 140 through an initial connection. Next, at step 404, the prefetch caching process 250 receives a response from the server or creates a response to the initial client request and determines based on the information in the response and preconfigured set of rules, which embedded objects to retrieve. At step 405, the prefetch caching process 250 opens a socket 145 (may be more than one socket) with the server 140 using, e.g., an Open command. Furthermore, the prefetch caching process 250 retrieves an embedded object 150 (or a plurality of embedded objects over one or more sockets) from the server using the socket. At step 410, the prefetch caching process determines if the selected embedded object 150 is marked as uncacheable or cacheable. If the object 150 is cacheable, then the conventional method for prefetching 415 is used, where the object is stored locally on disks 235.

However, if the object 150 is uncacheable, the prefetch caching process 250, at step 420, creates an entry for the uncacheable object 150 in the cache table 300. The entry's fields are populated with an Object ID 310, a File ID 320, a Flag 330, a Timestamp 340, and a Network Address 350. As noted, the network address can be an IP address of the network interface terminating the socket. At step 430, the prefetch caching process 250 loads the embedded object 150 into buffer 146 associated with socket 145 as described herein.

The prefetch cache 200 then waits for a subsequent client request for the embedded object. The prefetch caching process determines if a subsequent client request is received, at step 440. If a subsequent client request is not received, the prefetch caching process 250 determines, at step 445, if the difference between the actual time and the timestamp 340 is less than a threshold, e.g., 5 seconds. If the difference between the actual and the time stamp is more than the threshold, then at step 450, the prefetch caching process flushes the embedded object 150 from the buffer 146 associated with the socket 145. At step 455, the connection between the prefetch cache 200 and the server 140 is closed and the procedure completes at step 475. However, if the difference between the actual time and the time stamp 340 is less than or equal to the threshold, then the prefetch caching process determines if a subsequent client request is received yet, at step 440.

After the prefetch cache 200 receives a subsequent client request 160 for the uncacheable embedded object, the prefetch cache locates the socket 145 using the cache table 300, at step 465. At step 470, the embedded object 150 is served to the client socket 115 through the prefetch cache 200 using the socket 145. The procedure then completes, at step 475.

In summary, the prefetch cache 200 intercepts a request issued by a client 110 to an origin server 140 for, e.g., a webpage. The prefetch cache sends the client 110 the requested webpage that is either stored locally on the prefetch cache 200 or on the origin server 140. The prefetch cache then attempts to prefetch embedded objects in anticipation of a subsequent client request based on a preconfigured set of rules. The prefetch caching process retrieves one or more embedded objects using one or more socket connections between the server 140 and the prefetch cache 200. Furthermore, the prefetch caching process 250 determines if the selected embedded object 150 is cacheable or uncacheable. If uncacheable, the prefetch caching process 250 loads the embedded object 150 into buffer 146 up to the maximum capacity of the buffer or the maximum size of the object. The prefetch cache then waits for a client request 160 for the object. Upon receiving the client request 160, the prefetch caching process 250 locates the network address for the socket in a cache table 300 and then sends the embedded object 150 to a client socket 115.

Furthermore, when an uncacheable embedded object is marked max-age=0, the procedure 400 is used, even though the embedded object may be immediately writable to disk. Here, the prefetch cache requests the anticipated embedded object marked max-age=0, and the object is sent from the prefetch cache socket to the client socket through the prefetch cache 200. The buffer associated with the socket is more efficiently accessible than the server disks, thereby reducing the searching and downloading time needed to determine whether the embedded object 150 is an up-to-date version.

Figure 5:
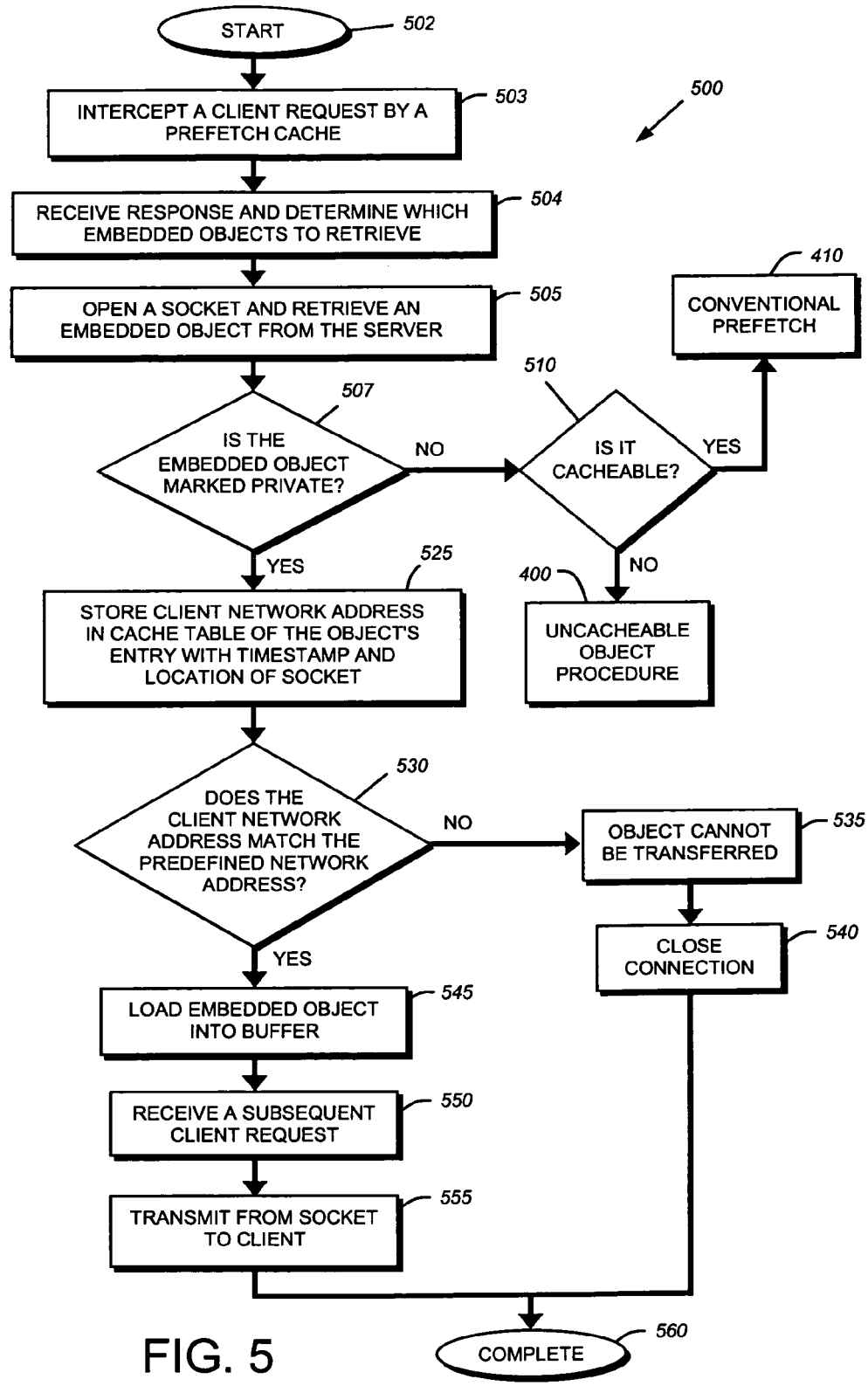
FIG. 5 is a flowchart illustrating the steps of a procedure for private object prefetch in accordance with an illustrative embodiment of the present invention.

FIG. 5 is a flowchart detailing the steps of a procedure 500 for private object prefetch in accordance with an illustrative embodiment of the present invention. The procedure 500 starts at step 502 and proceeds to step 503, where the prefetch cache intercepts a client request directed to the origin server 140 to retrieve a data set (which may be either stored locally on the prefetch cache 200 or on server 140). To retrieve data stored on the server 140, the prefetch cache 200 connects to the server 140 through an initial connection. The retrieved data set is then sent to the client. Next, at step 504, the prefetch caching process 250 receives a response from the server 140 or creates a response to the initial client request, and determines which embedded objects 150 to request in anticipation of a subsequent client request based on the response and a preconfigured set of rules. At step 505, the prefetch caching process opens a socket 145 and retrieves the selected embedded object 150 from the server 140. At step 507, the prefetch caching process 250 determines if the selected embedded object 150 is marked private or not (using, e.g., the cache table 300). If the object 150 is not marked private, then, at step 510, the prefetch caching process determines if the object is cacheable by reading the header information associated with the embedded object. If the object is cacheable, then the conventional method for prefetching 410 is used, where the object 150 is stored on disks 235 of the prefetch cache 200. If the object is uncacheable, then the uncacheable object procedure 400 is used.

If the object is marked as private, then at step 525, the prefetch caching process stores the network address of the client in field 360 of the cache table 300, along with the Object ID 310, the File ID 320, the Flag 330, the Timestamp 340, and the Network Address 350 of the socket 145. At step 530, the prefetch caching process 250 determines if the client network address matches a predefined network address allowed to retrieve the object. Note that the network address can be any type network address, such as an IP address. If the two network addresses do not match, then, at step 535, the embedded object cannot be transferred to the client. The prefetch cache 200 closes the connection to the server 140 at step 540, and the procedure completes at step 560. If the two network addresses match, then, at step 545, the prefetch caching process 250 loads the embedded object 150 into a buffer 146 associated with socket 145. At step 550, the prefetch cache 200 waits for a client request, at step 550. As noted, the client request must be made within a certain time period from loading of the buffer, i.e., the threshold time period. If the client request is not made or comes after the threshold, the embedded object is flushed from the buffer 146 and the socket 145 is closed.

At step 550, a client request is received by the prefetch cache 200, and at step 555, the prefetch caching process 250 serves the embedded object 150 from the socket 145 to the client socket 115. The procedure then completes at step 560.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for prefetching one or more embedded objects of a data set from a server, comprising:

intercepting a client request from a client for the data set at a prefetch cache;

prefetching the one or more embedded objects from the server in anticipation of subsequent client requests for the one or more embedded objects;

opening a socket on the prefetch cache to retrieve the one or more embedded objects from the server;

determining whether each embedded object is uncacheable;

based on the determination, loading a cacheable embedded object into one or more disks of the prefetch cache and loading an uncacheable embedded object into a buffer associated with the socket instead of in the one or more disks of the prefetch cache;

creating an entry in a cache table of the prefetch cache for the uncacheable embedded object and storing a timestamp in the entry of the cache table;

using the timestamp to determine whether the uncacheable embedded object has been stored in the buffer for longer than a threshold time period, and, if so, flushing the uncacheable embedded object from the buffer; otherwise receiving a subsequent client request for the uncacheable embedded object; and sending the uncacheable embedded object from the buffer to the client through the socket.

2. The method of claim 1, further comprising storing a network address in the entry of the cache table for the uncacheable embedded object.

3. The method of claim 2, further comprising locating the socket using the network address stored in the entry of the cache table.

4. The method of claim 1, further comprising storing a flag in the entry of the cache table for the uncacheable embedded object.

5. The method of claim 1, further comprising storing a file identifier in the entry of the cache table for the uncacheable embedded object.

6. The method of claim 1, further comprising waiting for a client request from the client for the uncacheable embedded object.

7. An apparatus for prefetching one or more embedded objects of a data set from a server, comprising:
   a processor operably coupled to a memory storing a computer-readable prefetch caching process that provides:
      means for intercepting a client request from a client for the data set;
      means for prefetching one or more embedded objects from the server in anticipation of subsequent client requests for the one or more embedded objects;
      means for opening a socket on the apparatus to retrieve the one or more embedded objects from the server;
      means for determining whether each embedded object is uncacheable;
      means for loading, based on the determination, a cacheable embedded object into one or more disks of the apparatus and loading, based on the determination, an uncacheable embedded object into a buffer associated with the socket instead of in the one or more disks of the apparatus;
      means for creating an entry in a cache table of the apparatus for the uncacheable embedded object;
      means for storing a timestamp in the entry of the cache table for the uncacheable embedded object;
      means for using the timestamp to determine whether the uncacheable embedded object has been stored in the buffer for longer than a threshold time period;
      means for flushing the uncacheable embedded object from the buffer if the uncacheable embedded object has been stored in the buffer for longer than the threshold time period;
      means for receiving a subsequent client request for the uncacheable embedded object; and
      means for sending the uncacheable embedded object to the client from the buffer through the socket.

8. The apparatus of claim 7, further comprising means for storing a network address in the entry of the cache table for the uncacheable embedded object.

9. The apparatus of claim 8, further comprising means for locating the socket using the network address stored in the entry of the cache table.

10. The apparatus of claim 7, further comprising means for storing a flag in the entry of the cache table for the uncacheable embedded object.

11. The apparatus of claim 7, further comprising means for storing a file identifier in the entry of the cache table for the uncacheable embedded object.

12. The apparatus of claim 7, further comprising means for waiting for a client request from the client for the uncacheable embedded object.

13. A system for prefetching one or more embedded objects of a dataset from a server, comprising:
   a prefetch cache adapted to intercept a client request from a client directed to the server for the data set;
   a prefetch caching process that executes on the prefetch cache, the prefetch caching process adapted to anticipate subsequent client requests based on a preconfigured set of rules, to open a socket on the prefetch cache to retrieve the one or more embedded objects from the server, to determine whether each embedded object is marked uncacheable to load, based on the determination, a cacheable embedded object into one or more disks of the prefetch cache and load, based on the determination, an uncacheable embedded object into a buffer associated with the socket;
   a cache table organized to include an entry for the uncacheable embedded object, wherein the entry of the cache table further stores a timestamp for the uncacheable embedded object; and
   wherein the prefetch caching process is further adapted to use the timestamp stored in the entry of the cache table to determine whether the uncacheable embedded object has been stored in the buffer for longer than a threshold time period and if so, to flush the uncacheable embedded object from the buffer, otherwise to receive a subsequent client request for the uncacheable embedded object and retrieve the uncacheable embedded object from the socket.

14. The system of claim 13 wherein the entry of the cache table stores a network address for the uncacheable embedded object.

15. The system of claim 14 wherein the prefetch caching process is further adapted to locate the socket using the network address stored in the entry of the cache table.

16. The system of claim 13 wherein the entry of the cache table further stores a flag for the uncacheable embedded object.

17. The system of claim 13 wherein the entry of the cache table further stores a file identifier for the uncacheable embedded object.

* * * * *